J. E. JOSLEN.
SHIELD FOR VEHICLE TIRES.
APPLICATION FILED JAN. 13, 1910.
986,007.
Patented Mar. 7, 1911.
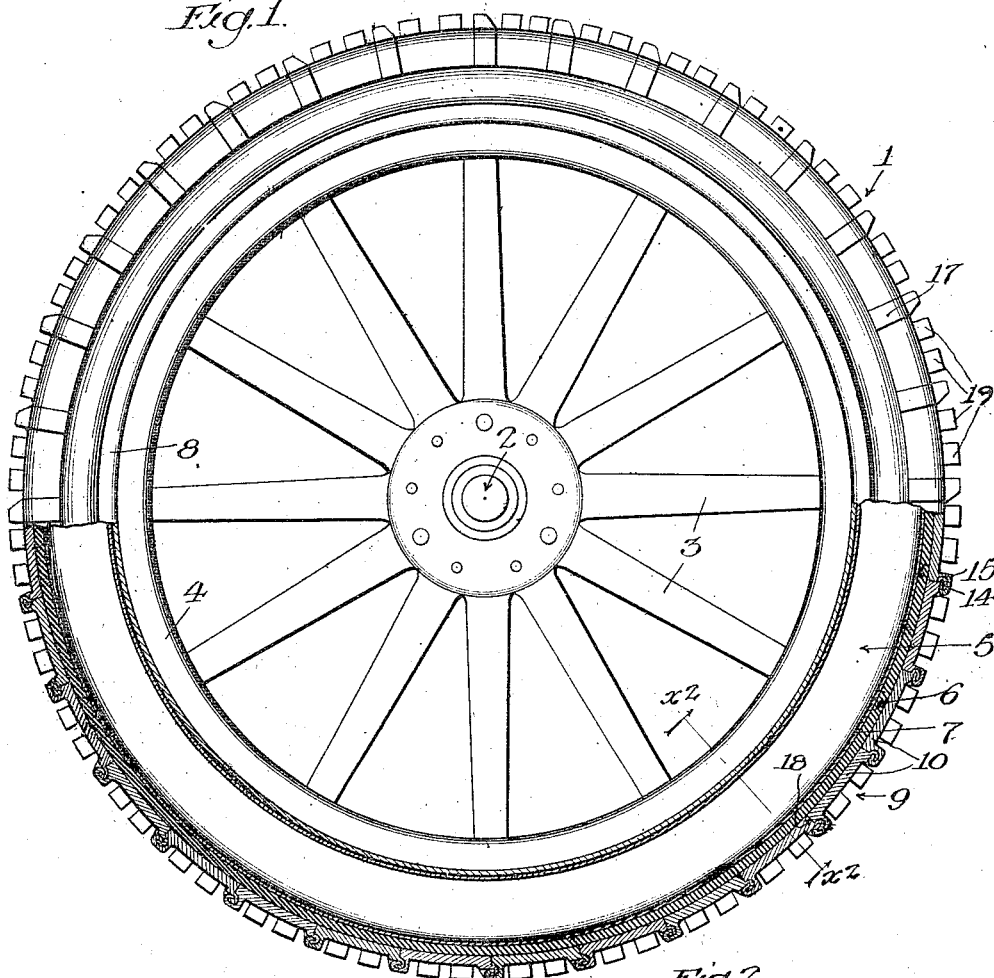
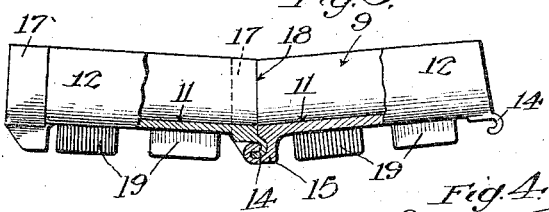
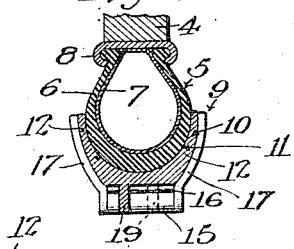
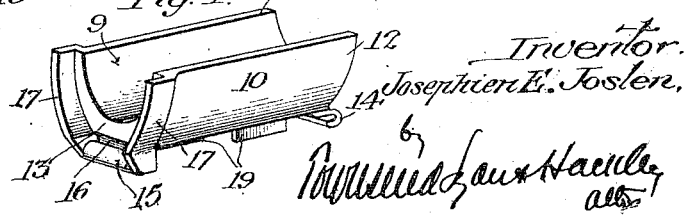

UNITED STATES PATENT OFFICE.

JOSEPHIEN E. JOSLEN, OF LOS ANGELES, CALIFORNIA.

SHIELD FOR VEHICLE-TIRES.

986,007.

Specification of Letters Patent. Patented Mar. 7, 1911.

Application filed January 13, 1910. Serial No. 537,922.

*To all whom it may concern:*

Be it known that I, JOSEPHIEN E. JOSLEN, a citizen of the United States, residing at Los Angeles, in the county of Los Angeles and State of California, have invented a new and useful Shield for Vehicle-Tires, of which the following is a specification.

This invention relates to shields for vehicle tires which fit over the ordinary pneumatic tire forming a shoe therefor of greater wearing qualities than the tire itself and which form a protection for the tire against puncture and wear.

One of the objects of my invention is to produce a shield of the character described which may be made in sections adapted to interlock with each other.

Another object of my invention is to produce a shield of the character described which is built up in sections adapted to fit over the ordinary pneumatic tire and to be held thereon without attachment to the other parts of the wheel.

Another object of my invention is to produce a shield of the character described which is simple and economical in construction and which may be readily attached to the tire.

Other objects and advantages will appear as hereinafter described.

Referring to the drawings which show an embodiment of the invention: Figure 1 is a side elevation, partly in section, of a vehicle wheel equipped with my invention. Fig. 2, is an enlarged transverse sectional view on the line $x^2$—$x^2$, Fig. 1. Fig. 3, is an enlarged side elevation, partly in section, of a portion of the shield. Fig. 4, is a perspective view of one of the units which form the shield.

1 designates a vehicle wheel having a hub 2, spokes 3, and felly 4. The tire 5 consists of an outer casing 6 and inner tube 7, and is secured in any preferred manner to a rim 8 on the felly 4.

The shield 9 is made preferably of cast metal and consists of a number of blocks or links 10 which together form a continuous tread for the tire 5. The inner surface 11 of the blocks 10 is rounded to conform to the exterior of the tire 5, the sides 12 of the blocks 10 extending inwardly over the tire approximately to the greatest transverse diameter of the tire.

The blocks 10 are made of interchangeable form, the tread portion 13 of each block is provided at one end with a flat projection forming a hook 14, the other end of the tread portion 13 is provided with a hollow lug 15, the recess 16 therein conforming to the shape of the hook 14. The ends of the blocks are made to conform to a radial line with the center of the wheel, so that when the blocks are assembled as hereinafter described, the ends of the adjacent blocks fit against each other, thereby forming a continuous shield for the tire. Each block 10 is provided at one end with extensions 17 on the sides 12 which extend over the joint 18 between the adjacent blocks, thereby preventing foreign substances from entering between the blocks and also forming end closures for the block connecting means heretofore described. The blocks 10 are provided on the tread portion 13 with projections 19 which extend outwardly a distance equal to the height of the lugs 15. The lugs 15 and projections 19 form gripping means for the tire. The blocks 10 are locked together by holding the adjacent blocks with the tread portion 13 of each block toward each other. With the blocks in this position the hook 14 of one block may be inserted into the mouth of the recess 16 and upon turning the blocks up into their permanent positions, the hook 14 fits into the recess as clearly shown in Fig. 3 of the drawing. The last two blocks 10 which complete the shield are fastened together in the same manner as the other blocks hereinabove described. The tire 5 is fitted within the shield, after which the tire is fastened to the rim of the wheel and the inner tube filled with air under pressure which holds the tire against the inner surface 11 of the blocks, thereby holding the shield firmly on the tire.

What I claim is:—

1. A shield for a vehicle tire comprising a plurality of links adapted to fit over the tread of the tire, each link comprising a block having a tread portion, side walls on said blocks extending inwardly over said tire, extensions on said walls extending over the joint between said blocks, and means for connecting said blocks together, said blocks forming a continuous imperforate shield for said tire, said extension on the side walls forming end closures for the block connecting means.

2. A shield for a vehicle tire comprising a plurality of links adapted to fit over the tread of the tire and form a continuous imperforate shield for the tire, said links comprising blocks having a tread portion, side walls extending inwardly from said tread portion, extensions on said side walls extending over the joint between said blocks, means for connecting said blocks together, said extensions on the side walls forming end closures for the block connecting means, said means extending outwardly from the tread of said blocks, and projections on said blocks between said connecting means, said connecting means and said projections forming gripping means for said shield.

In testimony whereof, I have hereunto set my hand at Los Angeles, California, this 7th day of January, 1910.

JOSEPHIEN E. JOSLEN.

In presence of—
 FRANK L. A. GRAHAM,
 P. H. SHELTON.

---

Copies of this patent may be obtained for five cents each, by addressing the "Commissioner of Patents, Washington, D. C."